United States Patent
Poirot-Crouvezier et al.

(10) Patent No.: US 11,482,714 B2
(45) Date of Patent: Oct. 25, 2022

(54) SYSTEM INCLUDING A FUEL CELL HAVING A PROTONS EXCHANGING MEMBRANE LIMITING FUEL LEAKAGE

(71) Applicant: Commissariat a l'energie atomique et aux energies alternatives, Paris (FR)

(72) Inventors: Jean-Philippe Poirot-Crouvezier, Saint-Georges de Commiers (FR); Sebastien Rosini, Grenoble (FR)

(73) Assignee: Commissariat a l'energie atomique et aux energies alternatives, Paris (FR)

( * ) Notice: Subject to any disclaimer, the term of this patent is extended or adjusted under 35 U.S.C. 154(b) by 18 days.

(21) Appl. No.: 16/217,591

(22) Filed: Dec. 12, 2018

(65) Prior Publication Data
US 2019/0181460 A1    Jun. 13, 2019

(30) Foreign Application Priority Data
Dec. 13, 2017   (FR) ...................... 17 62071

(51) Int. Cl.
*H01M 8/0258* (2016.01)
*H01M 8/0271* (2016.01)
(Continued)

(52) U.S. Cl.
CPC ....... *H01M 8/0258* (2013.01); *H01M 8/0271* (2013.01); *H01M 8/0273* (2013.01);
(Continued)

(58) Field of Classification Search
None
See application file for complete search history.

(56) References Cited

U.S. PATENT DOCUMENTS 8,101,314 B2 *  1/2012  Okabe ................. H01M 8/242
                                                    429/457
8,420,256 B2 *  4/2013  Ballantine .......... H01M 8/0271
                                                    429/185
(Continued)

FOREIGN PATENT DOCUMENTS

JP          2006179364 A  *  7/2006

OTHER PUBLICATIONS

Of Duan, Qiongjuan, et al. "Transport of Liquid Water Through Nation Membranes." Journal of Membrane Science, vol. 392-393, Dec. 11, 2011, pp. 88-94., doi:10.1016/j.memsci.2011.12.004 (Year: 2011).*
French Preliminary Search Report dated Oct. 3, 2018 in French Application 17 62071, filed on Dec. 13, 2017 (with English Translation of Categories of Cited Documents & Written Opinion).

*Primary Examiner* — Ula C Ruddock
*Assistant Examiner* — Amanda Rosenbaum
(74) *Attorney, Agent, or Firm* — Oblon, McClelland, Maier & Neustadt, L.L.P.

(57) ABSTRACT

A fuel cell includes a flow guide, a component for allowing a first fluid to flow from a first manifold to a second manifold and through a reactive zone, a peripheral seal disposed between the flow guide and the component, an intermediate seal disposed between the flow guide and the component, the intermediate seal being encircled by the peripheral seal and encircling the reactive zone, another component opposite the flow guide to allow a second fluid to flow from a third manifold to a fourth manifold and through another reactive zone, and a fluid flow circuit provided between the intermediate seal and the peripheral seal between fifth and sixth manifolds. One of the fifth and sixth manifolds is separated from the first to fourth manifolds by the intermediate seal.

18 Claims, 9 Drawing Sheets

(51) Int. Cl.
  *H01M 8/0273* (2016.01)
  *H01M 8/04089* (2016.01)
  *H01M 8/0267* (2016.01)
  *H01M 8/2483* (2016.01)
  *H01M 8/2455* (2016.01)
  *H01M 8/10* (2016.01)
  *H01M 8/241* (2016.01)
  *H01M 8/2457* (2016.01)
  *H01M 8/247* (2016.01)

(52) U.S. Cl.
  CPC ......... *H01M 8/04089* (2013.01); *H01M 8/10* (2013.01); *H01M 8/241* (2013.01); *H01M 8/247* (2013.01); *H01M 8/2457* (2016.02); *H01M 8/2483* (2016.02); *H01M 8/0267* (2013.01); *H01M 8/2455* (2013.01); *H01M 2008/1095* (2013.01)

(56) References Cited

U.S. PATENT DOCUMENTS

| | | | |
|---|---|---|---|
| 2005/0079400 A1 | 4/2005 | Sugiura et al. | |
| 2006/0110651 A1* | 5/2006 | Wakahoi | H01M 8/0267 |
| | | | 429/483 |
| 2008/0166608 A1* | 7/2008 | Nakaji | H01M 8/0267 |
| | | | 429/513 |
| 2008/0176136 A1 | 7/2008 | Ballantine et al. | |
| 2010/0279208 A1* | 11/2010 | Niezelski | H01M 8/0267 |
| | | | 429/514 |
| 2011/0195346 A1* | 8/2011 | Keyser | H01M 8/0297 |
| | | | 429/516 |
| 2016/0006045 A1* | 1/2016 | Zillich | H01M 8/0297 |
| | | | 429/434 |
| 2016/0072136 A1* | 3/2016 | Kageyama | H01M 8/242 |
| | | | 429/463 |

* cited by examiner

SYSTEM INCLUDING A FUEL CELL HAVING A PROTONS EXCHANGING MEMBRANE LIMITING FUEL LEAKAGE

BACKGROUND

The invention relates to fuel cells with a proton-exchange membrane for generating electricity.

Fuel cells with a proton-exchange membrane are used at an operating temperature below 300° C. The proton-exchange membrane forms a solid electrolyte. For low temperature applications, membranes of the perfluorosulfonated type or of the polybenzimidazole type charged with phosphoric acid are generally used.

In particular, a fuel cell commonly includes a stack of elementary cells in which an electrochemical reaction occurs between two reactants that are continuously introduced. The fuel is brought into contact with the anode, the oxidant is brought into contact with the cathode.

The reaction is subdivided into two half-reactions, which occur, on the one hand, at the anode/membrane interface and, on the other hand, at the cathode/membrane interface. The half-reactions can only occur if there is an ionic conductor between the two electrodes and an electronic conductor.

The fluids are brought into contact with reactional zones from inlet and outlet manifolds that generally traverse the stack from one end to the other. The fluids are generally guided between a manifold and their reactional zone by flow channels of a bipolar plate, which also fulfils an electric conduction function and a function for transmitting a force for clamping the stack of cells. Each manifold is surrounded by a seal that prevents mixing of the various fluids circulating in the fuel cell. Each cell is provided with means for injecting through the seals in order to bring the relevant fluid from the manifold to the reactional zone.

A peripheral seal is disposed on the periphery of each bipolar plate and thus encircles a middle part of the cell that includes the reactional zone and the flow manifolds. This peripheral seal provides a mutual seal for the various flow circuits and with the outside.

The various seals do not provide a perfect seal. In particular, a small amount of fuel tends to escape from the fuel cell. Thus, a small concentration of fuel remains present in the immediate environment of the fuel cell. When the fuel is dihydrogen, these leaks are further facilitated as the dihydrogen exhibits low viscosity. In order to limit the risks associated with the presence of fuel, and particularly of dihydrogen, in the vicinity of the fuel cell, in most cases a ventilation device is added thereto. However, in some applications of the fuel cell, the cell can be contained or the ventilation device can prove to be too expensive or technically incompatible.

In order to detect and contain a leak, a fuel cell design is disclosed in document JP 2006/179364 and proposes forming a reactive zone seal in the immediate vicinity of the reactive zone of the fuel cell. The reactive zone seal is encircled by the peripheral seal. An intermediate zone is provided between the peripheral seal and the reactive zone seal. Opposite manifolds are provided in the intermediate zone. Each manifold includes a probe for detecting a fluid originating from a leak. The fuel cell is positioned with one probe higher than the other: dihydrogen will be detected by the probe positioned in the manifold in the highest position, coolant will be detected by the probe positioned in the manifold in the lowest position. Particularly due to these positioning constraints, such a fuel cell can only be used in an experimental context for tests.

Document US 2006/110651 discloses a structure, in which a flow circuit is provided on the periphery of an anode reactive zone. This peripheral flow circuit is connected to the oxidant inlet and outlet manifolds and is therefore traversed by a flow bypassing the cathode reactive zone.

Such a structure neither allows this peripheral flow circuit to be supplied by a fluid different from those supplying the reactive zones, nor allows a fluid to be easily recovered in order to analyse the content of the leaks.

BRIEF SUMMARY

The aim of the invention is to overcome one or more of these disadvantages. The invention therefore relates to a fuel cell as defined in the appended claims.

The invention also relates to the variations of the dependent claims. A person skilled in the art will understand that each of the features of the variations of the dependent claims or of the description can be combined independently of the features of an independent claim, without necessarily forming an intermediate generalization.

BRIEF DESCRIPTION OF THE DRAWINGS

Further features and advantages of the invention will become clearly apparent from the following description, which is provided by means of a non-limiting illustration, with reference to the accompanying drawings, in which.

DETAILED DESCRIPTION

Figure 1:
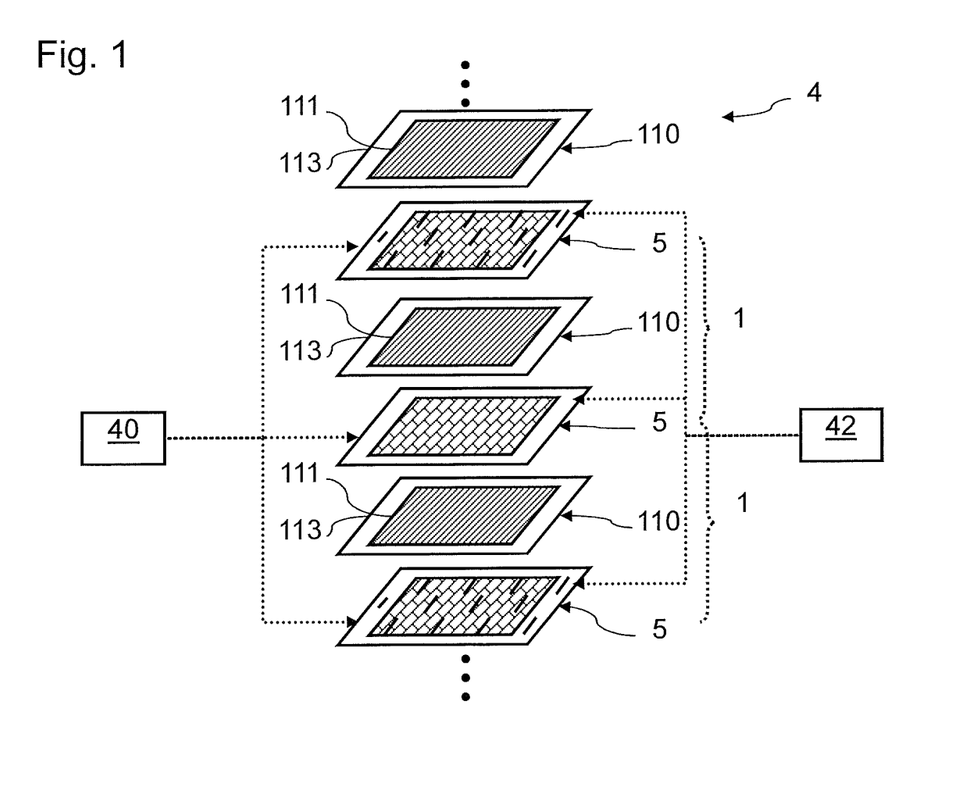
FIG. 1 is an exploded perspective view of an example of a stack of membrane electrode assemblies and of bipolar plates for a fuel cell.

FIG. 1 is an exploded schematic perspective view of a stack of cells 1 of a fuel cell 4. The vertical will define the direction along which the stack of cells 1 is produced. The fuel cell 4 comprises a plurality of superposed cells 1. The cells 1 are of the proton-exchange membrane or of the polymer electrolyte membrane type.

The fuel cell 4 comprises a fuel source 40. The fuel source 40 in this case supplies an input of each cell 1 with dihydrogen. The fuel cell 4 also comprises an oxidant source 42. The oxidant source 42 in this case supplies an input of each cell 1 with air, with the oxygen of the air being used as oxidizer. Each cell 1 also comprises exhaust channels. One or more cells 1 also have a circuit for cooling the reactive zone.

Each cell 1 comprises a membrane electrode assembly 110, or MEA 110. A membrane electrode assembly 110 comprises a solid electrolyte 113, a cathode (not shown) and an anode 111 placed on both sides of the electrolyte and attached to this electrolyte 113. The electrolyte layer 113 forms a membrane allowing proton conduction whilst being impermeable to the gases present in the cell. The electrolyte layer also prevents electrons from passing between the anode 111 and the cathode. The electrolyte 113 can be formed, for example, by a membrane of perfluorosulfonated, of polybenzimidazole (PBI) doped with phosphoric acid or by any proton conducting ionomer.

A bipolar plate 5 is disposed between each pair of adjacent MEAs. A bipolar plate 5 forms a reactant flow guide on each face of an MEA. Each bipolar plate 5 in this case defines anode flow channels and cathode flow channels on opposite outer faces. Bipolar plates 5 also advantageously define coolant flow channels between two successive membrane electrode assemblies. The bipolar plates 5 each can be formed, in a manner per se known, from two assembled conductive metal sheets, for example, made of stainless steel or of titanium alloy, aluminium alloy, nickel alloy or tantalum alloy. Each sheet then defines a respective outer face. The bipolar plates 5 also can be obtained by any other method, for example, moulding or injection from carbon-polymer composites. The bipolar plates 5 thus also can be formed as a single piece. The outer faces of the bipolar plate 5 are then defined by such a single-piece part. Each membrane electrode assembly 110 also can comprise a gas diffusion layer (not shown) disposed between the anode and a bipolar plate, and another gas diffusion layer disposed between the cathode and another bipolar plate. The membrane electrode assemblies 110 can comprise reinforcements, not shown herein.

In a manner per se known, when the fuel cell operates 4, air flows between an MEA 110 and a bipolar plate 5, and dihydrogen flows between this MEA 110 and another bipolar plate 5. A particular function of the bipolar plates 5 is to guide the flow of reactants on both sides of the MEA 110. At the anode, the dihydrogen is ionized in order to produce protons that traverse the MEA 110. The electrons produced by this reaction are collected by a bipolar plate 5. The produced electrons are then applied to an electric charge connected to the fuel cell 4 in order to form an electrical current. At the cathode, oxygen is reduced and reacts with the protons in order to form water. The reactions at the anode and at the cathode are managed as follows:

$2H_2 \rightarrow 4H^+ + 4e^-$ at the anode;

$4H^+ + 4e^- + O_2 \rightarrow 2H_2O$ at the cathode.

When it operates, a cell 1 of the fuel cell 4 normally generates a direct voltage of approximately 1 V between the anode and the cathode.

The oxidant source 42 typically comprises a compressor for introducing an air flow at a given pressure at the input of the cells 1. Such a compressor receives, for example, an air pressure setpoint or a flow rate setpoint, with the air pressure or the flow rate being able to be regulated by a variable rotation speed of the compressor.

The stack of bipolar plates 5 and of membrane electrode assemblies 110 is intended to form a plurality of flow manifolds. To this end, respective holes are provided through the bipolar plates 5 and through the membrane electrode assemblies 110. The holes of the bipolar plates 5 and of the membrane electrode assemblies 110 are disposed opposite each other in order to form the various flow manifolds.

Figure 2:
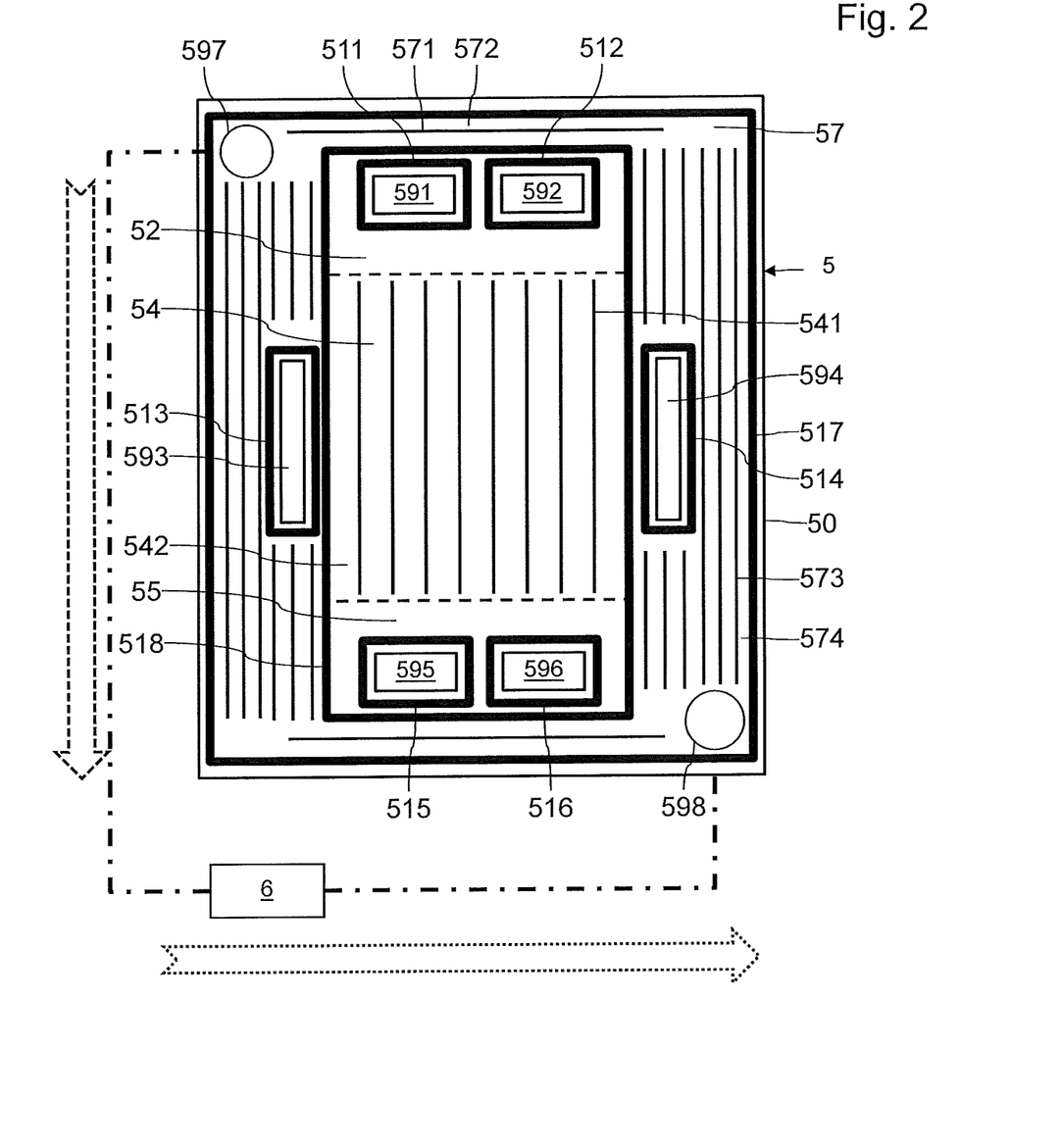
FIG. 2 is a view of an anode face of a bipolar plate of a fuel cell according to a first embodiment of the invention, provided with seals.

FIG. 2 is a view of an anode face of a bipolar plate 5 of a fuel cell 4 according to a first embodiment of the invention, provided with seals that will be described hereafter. The fuel cell 4 comprises an MEA 110 disposed opposite the bipolar plate 5, and not shown in this figure. The seals are pressed against the MEA 110. FIG. 2 shows an outer face of the bipolar plate 5 intended to guide fuel into a reactive zone 54 positioned in its middle section. Fuel is thus guided into the reactive zone 54 between the bipolar plate 5 and the MEA 110.

The bipolar plate 5 comprises holes or manifolds 591 and 592 at a first longitudinal end, and holes 595 and 596 at a second longitudinal end. The bipolar plate 5 comprises a hole 593 on a first side and a hole 594 on a second side of the reactive zone. The holes 593 and 594 are substantially positioned midway between the holes 591 and 596. The holes 591 to 596 are encircled by seals 511 to 516, respectively.

The hole 591 is used, for example, to form a fuel supply manifold, the hole 596 is used, for example, to form a manifold for discharging combustion residues and unused fuel. The hole 593 is used, for example, to form a coolant supply manifold for the reactive zone 54, the hole 594 is used, for example, to form a coolant discharge manifold. The hole 592 is used, for example, to form an oxidant supply manifold, and the hole 595 is used, for example, to form a manifold for discharging produced water and unused oxidant. The flow direction of the coolant is schematically shown herein using the dotted arrow. The flow direction of the reactants is schematically shown herein using the dashed arrow. The flow of coolant is thus substantially perpendicular to the flow of the reactants.

The bipolar plate 5 in this case is formed by two sheets rigidly connected together, with FIG. 2 showing an outer face of a sheet 50. In order to guide the fuel in the reactive zone 54, the bipolar plate 5 in this case comprises flow channels 542 delimited by walls 541. Fuel homogenization zones 52 and 55 are advantageously provided on both sides of the reactive zone 54. The homogenization zones 52 and 55 connect the manifold 591 with the flow channels 542 and the manifold 596 with the flow channels 542, respectively, in a manner per se known.

An intermediate seal 518 encircles the reactive zone 54, the homogenization zones 52 and 55 and the manifolds 591, 592, 595 and 596. The flow of fuel between the manifolds 591 and 596 is thus normally contained by the seal 518.

A peripheral seal 517 encircles all the holes or manifolds 591 to 596 and the intermediate seal 518. An intermediate zone 57 is thus provided between the seals 517 and 518. The manifolds 593 and 594 in this case are provided in the intermediate zone 57.

Flow manifolds 597 and 598 are also provided in the intermediate zone 57. The manifold 597 is intended to introduce a fluid into the intermediate zone 57, with the manifold 598 being intended to discharge this fluid. In order to transition from the manifold 597 to the manifold 598, the fluid must pass through a flow circuit provided in the intermediate zone 57. This flow circuit notably runs along the intermediate seal 518 in order to be able to recover any fuel that has crossed the line of the seal 518. The fuel cell 4 further comprises a pump 6 configured to convey a fluid between the manifold 597 and the manifold 598 through the flow circuit of the intermediate zone 57. The manifolds 597 and 598 may or may not be encircled by seals. According to the invention, at least one of the manifolds 597 and 598 is separated from the manifolds 591, 592, 595 and 596 by the seal 518, in order to be able to either supply the intermediate zone 57 through the manifold 597 with a fluid different from that supplying the reactive zones, or to be able to easily analyse the content of the fluid originating from the intermediate zone 57 and recovered in the manifold 598. In the example shown, the manifolds 597 and 598 are both separated from the manifolds 591, 592, 595 and 596 by the seal 518.

In the example shown, the bipolar plate 5 is of substantially rectangular shape. The seals 517 and 518 in this case are also of rectangular shape in order to describe a simplified configuration of the invention.

In this configuration, the manifolds 597 and 598 are positioned in opposite corners of the intermediate zone 57. The flow circuit between the manifolds 597 and 598 in this case encircles the entire circumference of the seal 518, with the fluid flowing through the flow circuit thus being able to recover fuel, regardless of the location of the leak. The flow circuit in this case comprises flow channels 572 delimited by walls 571 extending in the widthwise direction of the bipolar plate 5. The flow circuit also comprises flow channels 574 delimited by walls 573 extending in the lengthwise direction of the bipolar plate 5. The flow channels 572 and 574 allow a flow of fluid to be promoted throughout the intermediate zone 57, in order to prevent any leaked fuel from accumulating in zones of this intermediate zone 57.

The fluid circulating between the manifolds 597 and 598 is thus capable of conveying any fuel that has been able to leak from the reactive zone 54, in order to prevent its concentration in the vicinity of the fuel cell 4. Circulating a fluid such as air, a neutral gas or a liquid can be contemplated for conveying the fuel. Particularly for air, an air flow rate will be selected that guarantees the non-explosivity of the mixture, namely a hydrogen concentration below 4%. The use of coolant circulating between the manifolds 597 and 598 allows ignition risks to be limited when recovering a fuel leak.

Figure 3:
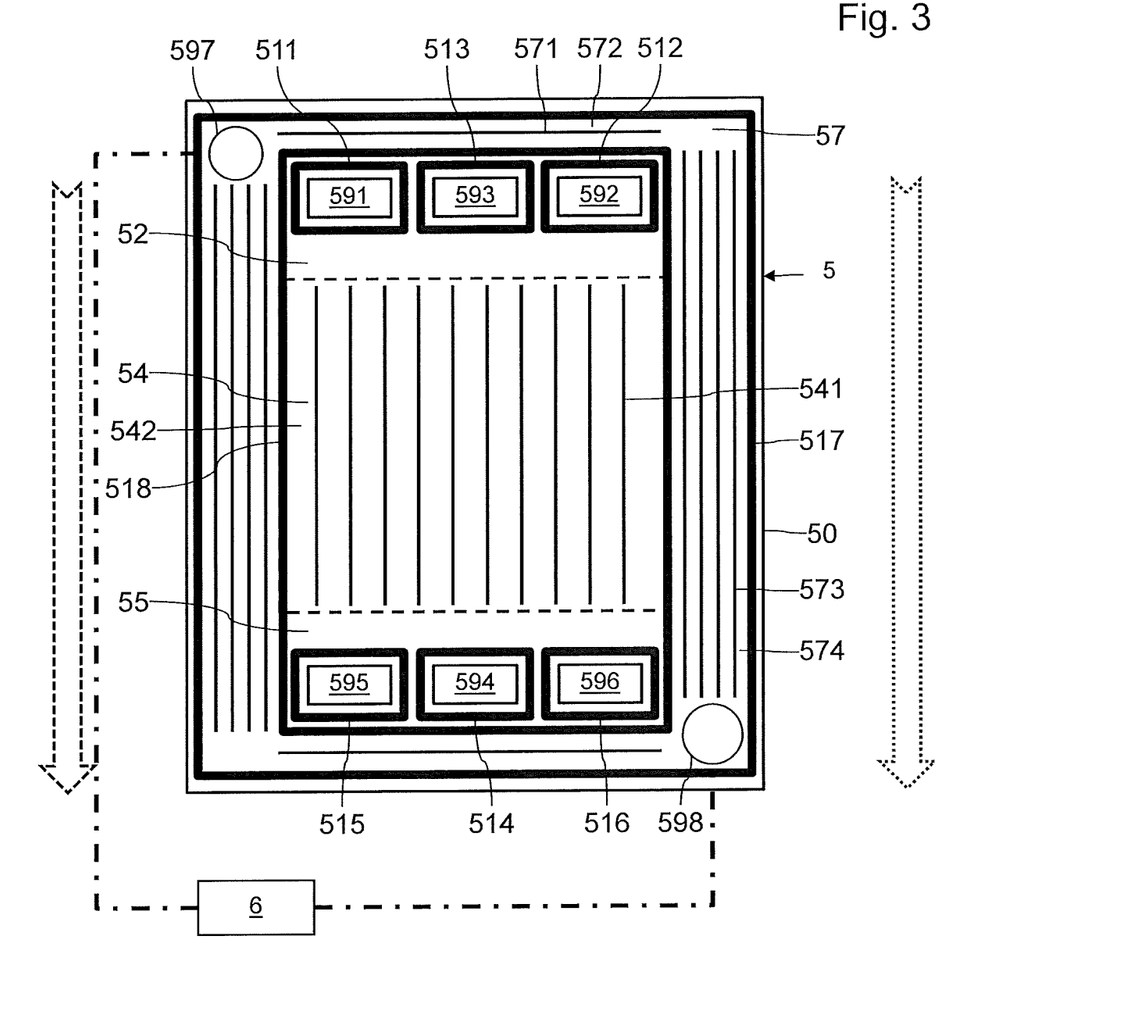
FIG. 3 is a view of an anode face of a bipolar plate of a fuel cell according to a second embodiment of the invention, provided with seals.

FIG. 3 is a view of an anode face of a bipolar plate 5 of a fuel cell 4 according to a second embodiment of the invention, provided with seals that will be described hereafter. The fuel cell 4 comprises an MEA 110 disposed opposite the bipolar plate 5, and not shown in this figure. The seals are pressed against the MEA 110. FIG. 3 shows an outer face of the bipolar plate 5 intended to guide fuel into a reactive zone 54 positioned in its middle section. Fuel is thus guided into the reactive zone 54 between the bipolar plate 5 and the MEA 110.

The bipolar plate 5 comprises holes 591 to 593 at a first longitudinal end, and holes 594 to 596 at a second longitudinal end. The holes 591 to 596 are encircled by seals 511 to 516, respectively. The holes 591 to 596 have the same functions as for the first embodiment. The flow direction of the coolant is schematically shown herein by the dotted arrow. The flow direction of the reactants is schematically shown herein by the dashed arrow. The flow of coolant is thus substantially parallel to the flow of the reactants.

The bipolar plate 5 in this case is formed by two sheets rigidly connected together, with FIG. 2 showing an outer face of a sheet 50. In order to guide the fuel in the reactive zone 54, the bipolar plate 5 in this case comprises flow channels 542 delimited by walls 541. Fuel homogenization zones 52 and 55 are advantageously provided on both sides of the reactive zone 54. The homogenization zones 52 and 55 connect the manifold 591 with the flow channels 542 and the manifold 596 with the flow channels 542, respectively, in a manner per se known.

An intermediate seal 518 encircles the reactive zone 54, the homogenization zones 52 and 55 and the manifolds 591 to 596. The flow of fuel between the manifolds 591 and 596 is thus normally contained by the seal 518. A peripheral seal 517 encircles the intermediate seal 518. An intermediate zone 57 is thus provided between the seals 517 and 518.

Flow manifolds 597 and 598 are provided in the intermediate zone 57. The manifold 597 is intended to introduce a fluid into the intermediate zone 57, with the manifold 598 being intended to discharge this fluid. In order to transition from the manifold 597 to the manifold 598, the fluid must pass through a flow circuit provided in the intermediate zone 57. This flow circuit notably runs along the intermediate seal 518 in order to be able to recover any fuel that has crossed the line of the seal 518. The fuel cell 4 further comprises a pump 6 configured to convey a fluid between the manifold 597 and the manifold 598 through the flow circuit of the intermediate zone 57. The manifolds 597 and 598 may or may not be encircled with seals.

In the example shown, the bipolar plate 5 is of substantially rectangular shape. The seals 517 and 518 in this case are also of rectangular shape in order to describe a simplified configuration of the invention.

In this configuration, the manifolds 597 and 598 are positioned in opposite corners of the intermediate zone 57. The flow circuit between the manifolds 597 and 598 in this case encircles the entire circumference of the seal 518, with the fluid flowing through the flow circuit thus being able to recover fuel, regardless of the location of the leak. The flow circuit in this case comprises flow channels 572 delimited by walls 571 extending in the widthwise direction of the bipolar plate 5. The flow circuit also comprises flow channels 574 delimited by walls 573 extending in the lengthwise direction of the bipolar plate 5. The flow channels 572 and 574 allow a flow of fluid to be promoted throughout the intermediate zone 57, in order to prevent any leaked fuel from accumulating in zones of this intermediate zone 57.

The fluid circulating between the manifolds 597 and 598 is thus capable of conveying any fuel that has been able to leak from the reactive zone 54, in order to prevent its concentration in the vicinity of the fuel cell 4. Circulating a fluid such as air, a neutral gas or a liquid can be contemplated for conveying the fuel.

The fluid circulating in the intermediate zone 57 for the various embodiments either can be a dedicated fluid isolated from the other fluids of the fuel cell 4 (reactants and coolants) or can be connected to a circuit for circulating another fluid. For example, it is possible to contemplate the fluid circulating in the intermediate zone 57 being coolant also circulating vertically relative to the reactive zone 54. It is also possible to contemplate that the fluid circulating in the intermediate zone 57 is oxidant, for example air circulating in the vicinity of a cathode face.

Figure 4:
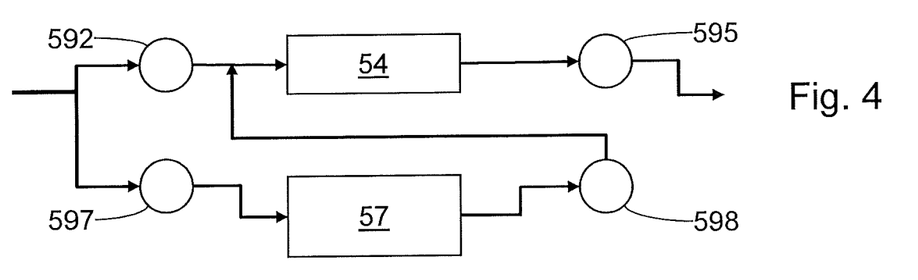
FIGS. 4 to 6 schematically show various configurations of flow circuits for fuel cells according to the invention.
Figure 5:
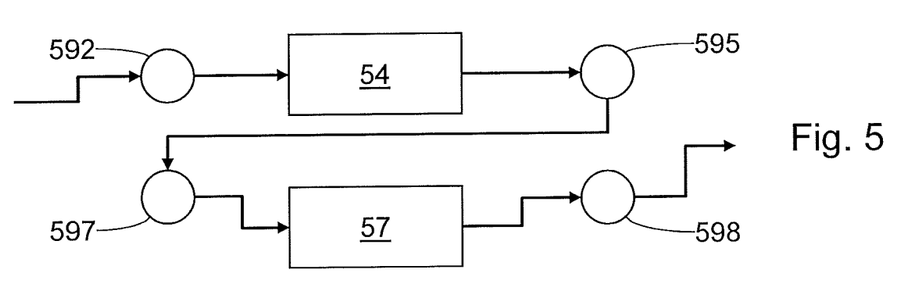
Figure 6:
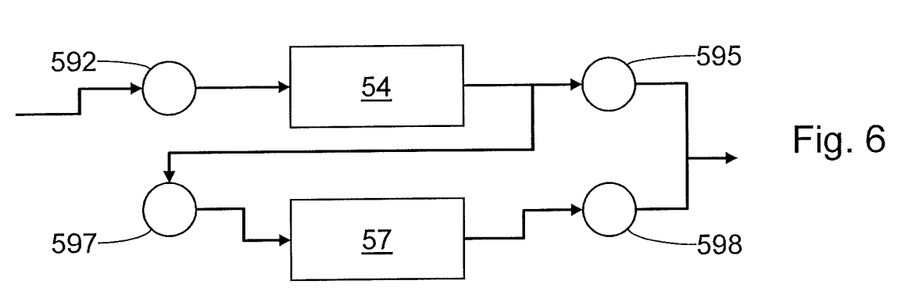

FIGS. 4 to 6 schematically show various configurations of flow circuits in the intermediate zone 57, connected to another fluid flow circuit passing through the bipolar plates 5 vertically relative to the reactive zone 54.

In the configuration of FIG. 4, an output of the pump 6 is connected, on the one hand, to the manifold 592 and, on the other hand, to the manifold 597. The manifold 598 is connected downstream of the manifold 592, between the manifold 592 and the reactive zone 54. An analysis of the content of the fluid traversing the intermediate zone 57 can be performed at the manifold 598. The input of the pump 6 is connected to the manifold 595. Air is then sampled before entering the reactive zone 54, in order to be introduced into the intermediate zone 57, then reintroduced upstream of this reactive zone 54.

In the configuration of FIG. 5, an output of the pump 6 is connected to the manifold 592. The manifold 595 is connected to the manifold 597. The manifold 598 is connected to the input of the pump 6. Air is thus sampled at the output of the reactive zone 54 in order to traverse the intermediate zone 57. The fluid traversing the intermediate zone 57 is thus different from that which supplies the anode and cathode reactive zones.

In the configuration of FIG. 6, an output of the pump 6 is connected to the manifold 592. The manifold 597 is connected upstream of the manifold 595, between the reactive zone 54 and the manifold 595. The fluid traversing the intermediate zone 57 is thus different from that which supplies the anode and cathode reactive zones. The input of the pump 6 is connected, on the one hand, to the manifold 595 and, on the other hand, to the manifold 598.

The air introduced into the manifold 597 can previously traverse a humidifier or a phase separator.

A similar configuration also can be contemplated for these various variations with a circuit for coolant instead of air, by replacing the manifold 592 with the manifold 593 and by replacing the manifold 595 with the manifold 594.

The configurations of FIGS. 5 and 6 prove to be particularly advantageous with air used as fluid in the flow circuits of the intermediate zone 57, since air sampled at the output of the reactive zone 54 comprises a low proportion of oxygen and thus limits the risks of combustion in the event of a dihydrogen leak. It thus proves to be advantageous to be able to circulate a fluid different from that of the oxidant supply of the cathode reactive zone, since it is depleted of oxygen.

Figure 7:
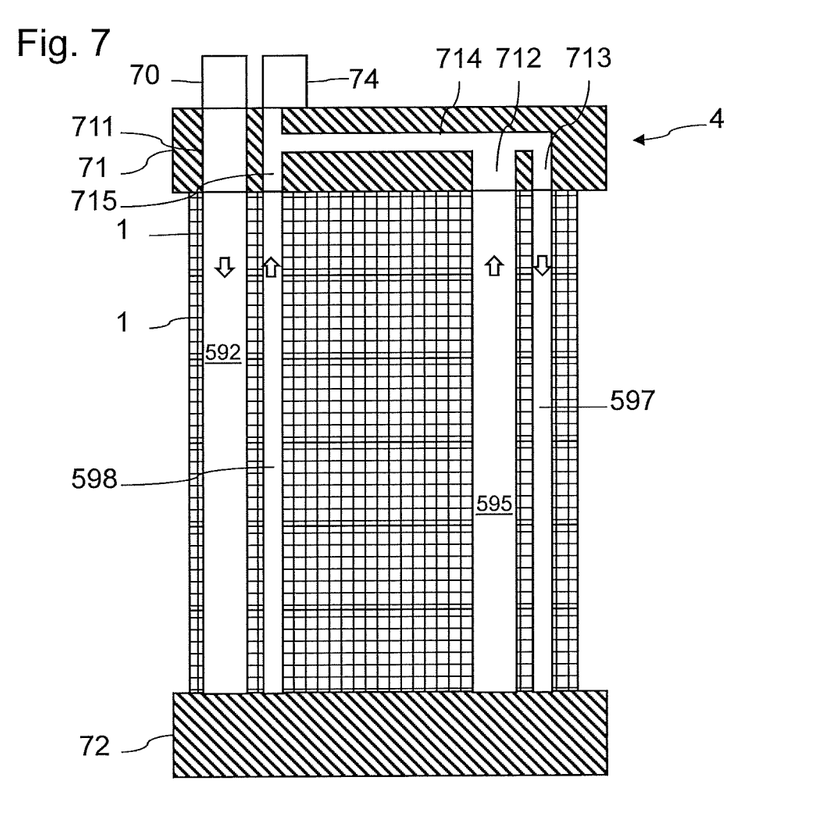
FIG. 7 is a schematic section view of an example of a fuel cell according to the invention.

FIG. 7 is a schematic section view of an example of a fuel cell 4 according to the invention. In this case, the stack of cells 1 is traversed by a manifold 592 for supplying fuel and is traversed by a manifold 595 for discharging combustion residues. In this case, the stack of cells 1 is traversed by the manifolds 597 and 598. The cell 4 further comprises clamping plates 71 and 72 disposed on both sides of the stack. The clamping plates 71 and 72 are used in a manner per se known to apply a compression force on the stack, in the direction of this stack. The clamping plates 71 and 72 further comprise pipes intended to obtain the flow configuration shown with reference to FIG. 6.

The clamping plate 71 comprises:
a through-bore 711. The through-bore 711 connects a fuel supply input 70 with the manifold 592;
a through-bore 715. The through-bore 715 connects a combustion residues output 74 with the manifold 598;
a bore 712 connected with the manifold 595;
a bore 713 connected with the manifold 597. The bore 713 is connected to the bore 712, so that the combustion residues originating from the manifold 595 can be introduced into the manifold 597;
a bore 714 connecting the bore 712 and the bore 715. The bore 714 is intended to form a load loss between the bores 712, 715, in order to promote a flow from the bore 712 to the bore 713. A load loss is obtained, for example, by producing a baffle inside the bore 714. The value of this load loss must allow a fraction of the flow exiting the manifold 595 to circulate in the intermediate zones 57 of each cell, whereas the remainder of the flow exiting the manifold 595 flows towards the output 75 through the bores 714 and 715. In this example, the fluid passing through the manifolds 597 and 598 is different from the fluid supplying the manifold 592, since the fluid passing through the manifolds 597 and 598 has previously traversed the anode reactive zone.

The pipes 711 to 715 can be produced in a manner per se known by machining or moulding the clamping plate 71.

The cell 4 is shown herein as a section view through a stack of electrochemical cells 1. For the sake of simplifying the illustration of certain flow circuits, the flow manifold 592 is shown herein on the periphery of the cell 4, whereas in reality it is disposed in its middle zone.

It is also possible to contemplate the connections of the various manifolds being made at a cylinder head that is common to a plurality of stacks.

Figure 8:
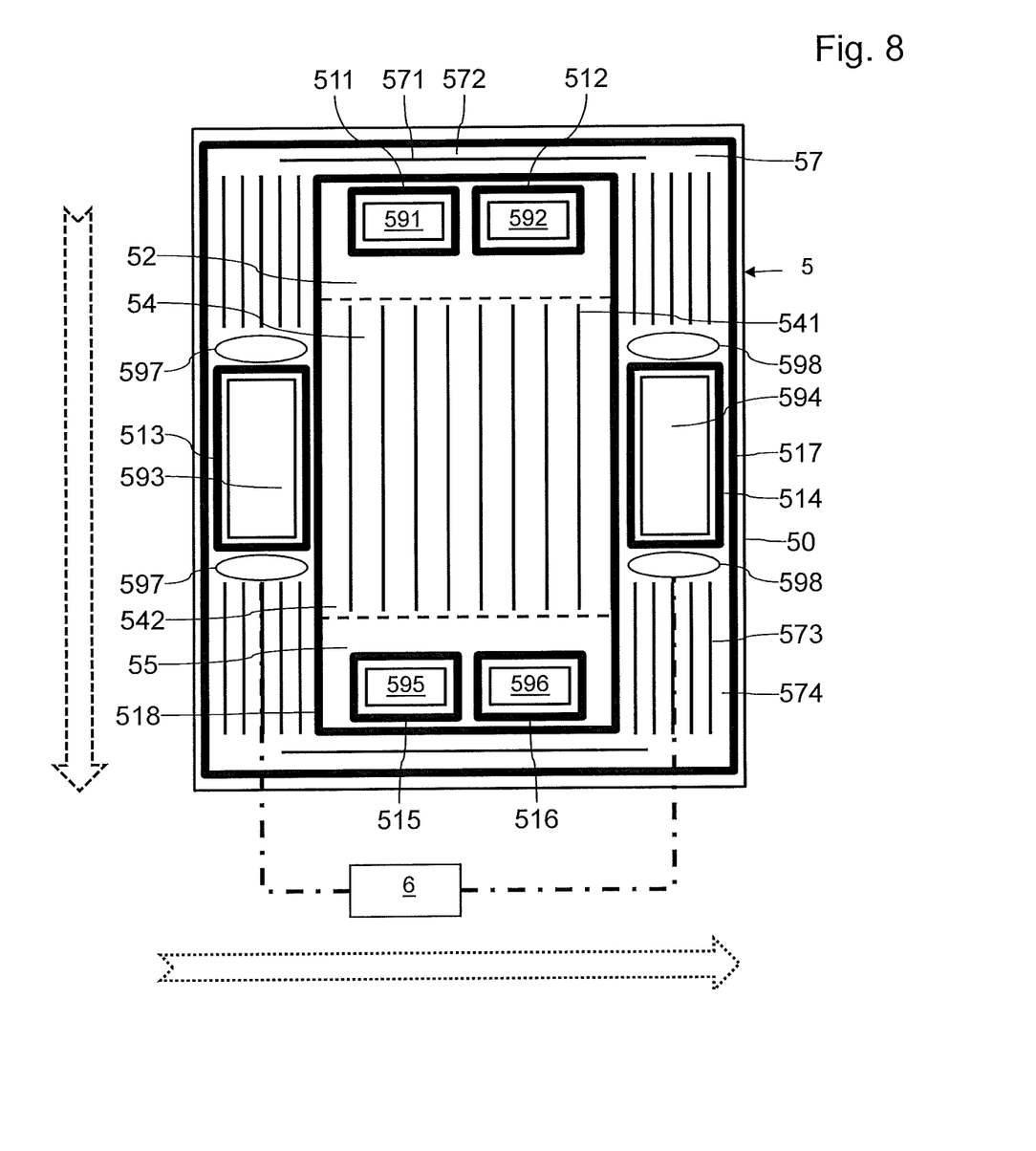
FIG. 8 is a view of an anode face of a variation of the fuel cell of the first embodiment.

FIG. 8 is a view of an anode face of a variation of the fuel cell of the first embodiment, provided with seals that will be described hereafter. The fuel cell 4 comprises an MEA 110 disposed opposite the bipolar plate 5, and not shown in this figure. The seals are pressed against the MEA 110. FIG. 8 shows an outer face of the bipolar plate 5 intended to guide fuel into a reactive zone 54 positioned in its middle section. Fuel is thus guided into the reactive zone 54 between the bipolar plate 5 and the MEA 110 by means of flow channels 542 delimited by walls 541. Fuel homogenization zones 52 and 55 are advantageously provided on both sides of the reactive zone 54.

The bipolar plate 5 comprises holes or manifolds 591 to 596 assuming the same position and the same function as in the example of FIG. 2. The holes 591 to 596 are encircled by seals 511 to 516, respectively. The homogenization zones 52 and 55 connect the manifold 591 with the flow channels 542 and the manifold 596 with the flow channels 542, respectively, in a manner per se known.

An intermediate seal 518 and a peripheral seal 517 have substantially the same configuration as in the example of FIG. 2. An intermediate zone 57 is thus delimited between the seals 517 and 518.

In this variation, a plurality of separate flow circuits is provided in the intermediate zone 57. To this end, the fuel cell 4 comprises two manifolds 597 positioned on both sides of the manifold 593. The fuel cell 4 also comprises two manifolds 598 positioned on both sides of the manifold 594. A first flow circuit thus bypasses the manifolds 591 and 592 in order to connect a manifold 597 and a manifold 598. A second flow circuit bypasses the manifolds 595 and 596 in order to connect another manifold 597 and another manifold 598. The first and second flow circuits in this case comprise two flow channels 572 delimited by walls 571 extending in the widthwise direction of the bipolar plate 5. The first and second flow circuits also comprise flow channels 574 delimited by walls 573 extending in the lengthwise direction of the bipolar plate 5. The flow channels 572 and 574 allow a flow of fluid to be promoted throughout the intermediate zone 57, in order to prevent any leaked fuel from accumulating in zones of this intermediate zone 57. The flow manifolds 597 and 598 are separated from the manifolds 591, 592, 595 and 596 by the seal 518.

Figure 9:
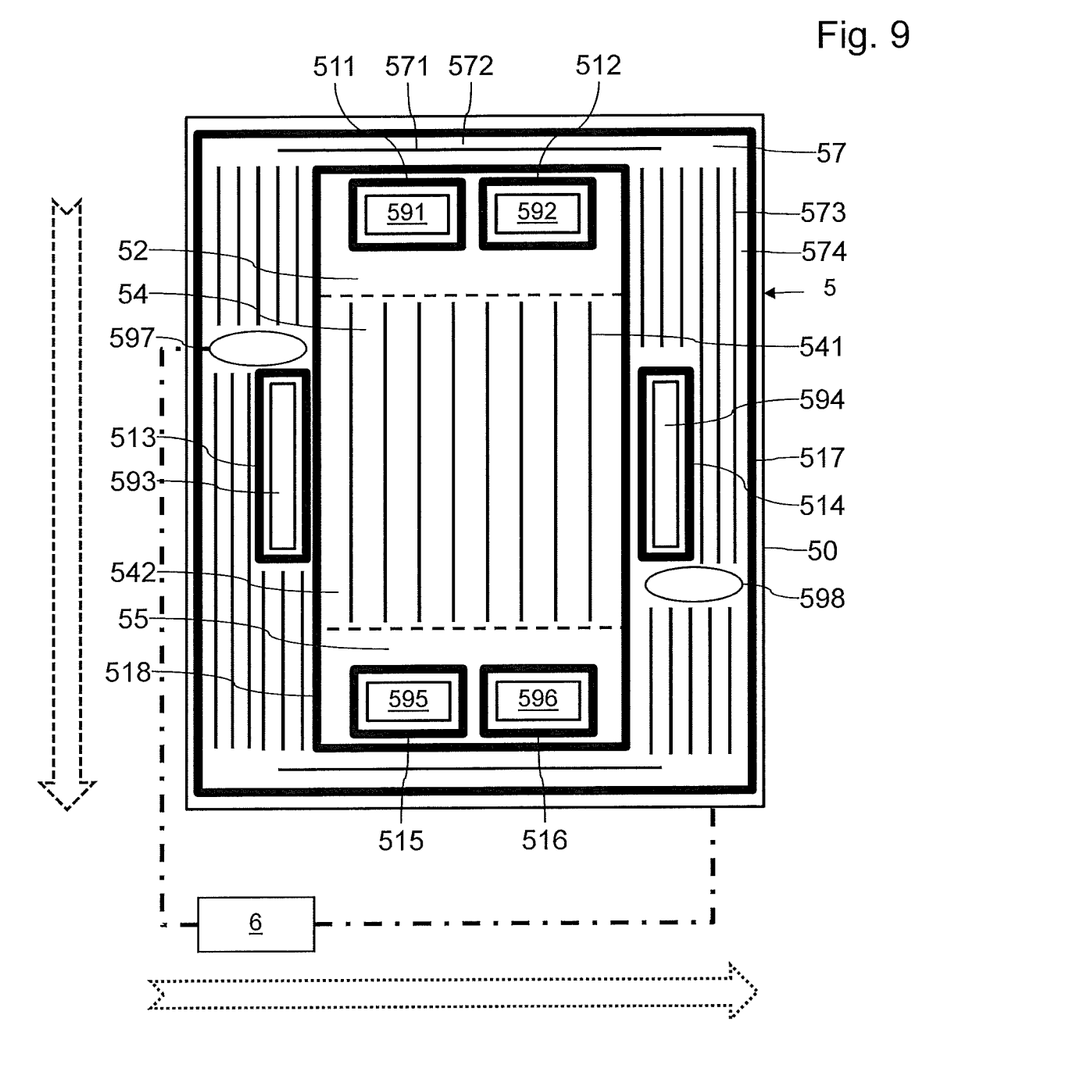
FIG. 9 is a view of an anode face of another variation of the fuel cell of the first embodiment.

FIG. 9 is a view of an anode face of another variation of the fuel cell 4 of the first embodiment, provided with seals that will be described hereafter. The fuel cell 4 comprises an MEA 110 disposed opposite the bipolar plate 5, and not shown in this figure. The seals are pressed against the MEA 110. FIG. 9 shows an outer face of the bipolar plate 5 intended to guide fuel into a reactive zone 54 positioned in its middle section. Fuel is thus guided into the reactive zone 54 between the bipolar plate 5 and the MEA 110 by means of flow channels 542 delimited by walls 541. Fuel homogenization zones 52 and 55 are advantageously provided on both sides of the reactive zone 54.

The bipolar plate 5 comprises holes or manifolds 591 to 596 assuming the same position and the same function as in the example of FIG. 2. The holes 591 to 596 are encircled by seals 511 to 516, respectively. The homogenization zones 52 and 55 connect the manifold 591 with the flow channels 542 and the manifold 596 with the flow channels 542, respectively, in a manner per se known.

An intermediate seal 518 and a peripheral seal 517 have substantially the same configuration as in the example of FIG. 2. An intermediate zone 57 is thus delimited between the seals 517 and 518.

In this variation, a plurality of flow circuits is provided in the intermediate zone 57. To this end, the fuel cell 4 comprises a manifold 597 positioned in the vicinity of the manifold 593. The fuel cell 4 also comprises a manifold 598 positioned in the vicinity of the manifold 594. A first flow circuit thus bypasses the manifolds 591 and 592 in order to connect the manifold 597 and the manifold 598. A second flow circuit bypasses the manifolds 595 and 596 in order to connect the manifold 597 and the manifold 598.

The first and second flow circuits in this case comprise flow channels 572 delimited by walls 571 extending in the widthwise direction of the bipolar plate 5. The first and second flow circuits also comprise flow channels 574 delimited by walls 573 extending in the lengthwise direction of the bipolar plate 5. The flow channels 572 and 574 allow a flow of fluid to be promoted throughout the intermediate zone 57, in order to prevent any leaked fuel from accumulating in zones of this intermediate zone 57. The flow manifolds 597 and 598 are separated from the manifolds 591, 592, 595 and 596 by the seal 518.

If the fluid introduced into the flow circuits originates from the output manifold 594, good temperature homogeneity advantageously can be maintained around the seal 518, and at a relatively high level, since it substantially corresponds to the temperature of the reaction zone 54. Furthermore, the use of the heat transfer fluid has been shown. The fluid introduced into the flow circuits 57 also can be air, and particularly depleted air.

A fuel cell can include superposed peripheral flow circuits, with a view to each recovering a leak of a specific fluid originating from the reactive zone 54. These various flow circuits can be traversed either by the same fluid or by different fluids. If the superposed flow circuits are traversed by different fluids, these different flow circuits will have respective inlet and outlet manifolds or injectors.

Figure 10:
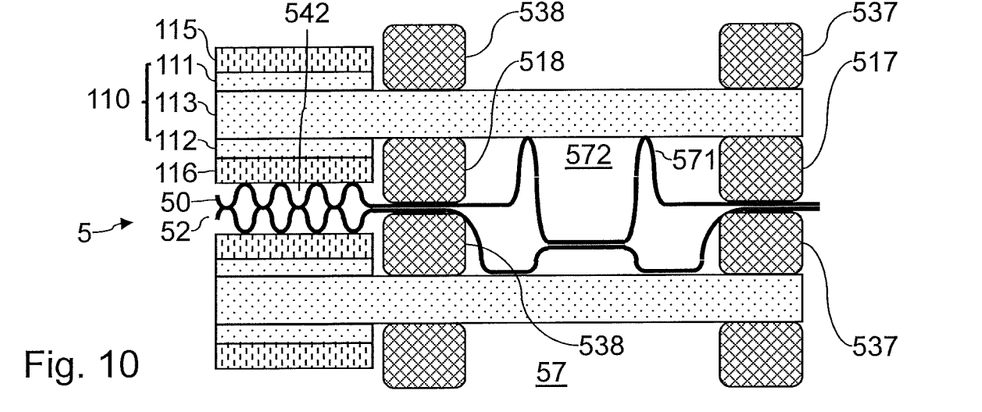
FIGS. 10 to 15 are section views of various variations of fuel cells in the vicinity of intermediate zones.

FIG. 10 is a transverse section view of a fuel cell in the vicinity of the middle zone 57. In this configuration, the middle zone 57 is intended to only recover leaks originating from the fuel flow channels 542. A peripheral seal 537 is positioned vertically relative to the peripheral seal 517 (or according to another definition, the peripheral seals 537 and 517 are superposed in the direction of the stack), on an outer face opposite a bipolar plate 5. The seals 517 and 537 are separated, on the one hand, by a membrane 113 and, on the other hand, by a bipolar plate 5. An intermediate seal 538 is positioned vertically relative to the intermediate seal 518 (or according to another definition, the peripheral seals 538 and 518 are superposed in the direction of the stack), on an outer face opposite the bipolar plate 5. The seals 518 and 538 are separated, on the one hand, by a membrane 113 and, on the other hand, by a bipolar plate 5. In the middle zone 57, a flow circuit is only defined between the seals 517 and 518, with a flow between the sheets 51 and 52 and a flow between the seals 537 and 538 being blocked.

In the example shown, the membrane electrode assembly 110 comprises gaseous diffusion layers 115 and 116 in contact with respective bipolar plates 5. In the example shown, the bipolar plates 5 each comprise two sheets 50 and 52 that are superposed and rigidly connected together.

Figure 11:
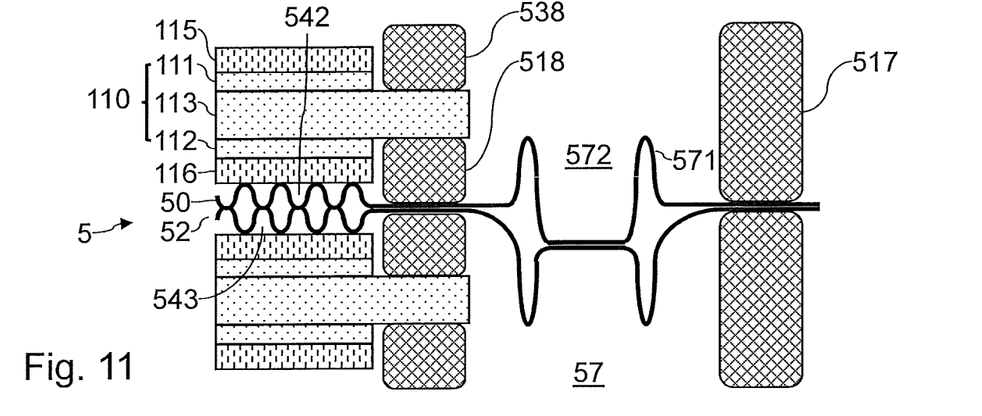

FIG. 11 is a variation of the configuration of FIG. 10. In this variation, the membrane 113 is interrupted at the seals 518 and 538. A seal 517 extends between two adjacent bipolar plates. The flow circuit provided in the intermediate zone 57 in this case is intended to recover both leaks originating from hydrogen flow channels 542 and leaks originating from air flow channels 543.

Figure 12:
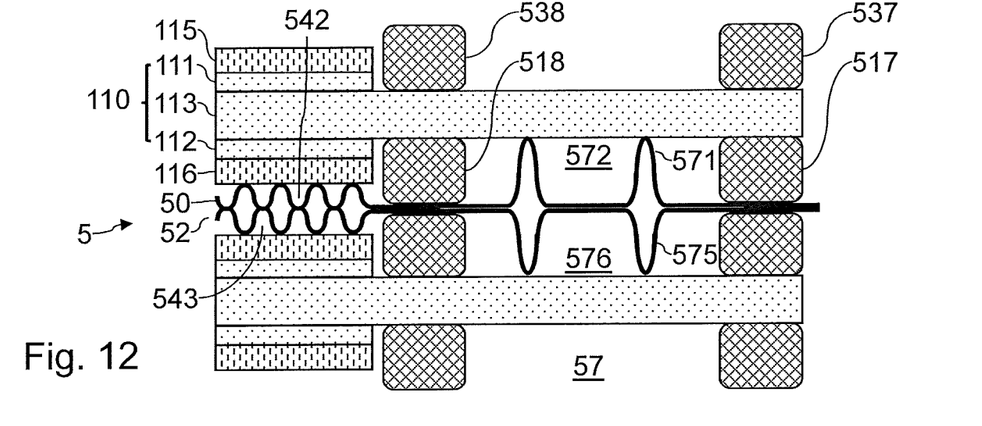

FIG. 12 is a variation of the configuration of FIG. 10. In this variation, flow channels 576 are provided opposite the channels 572, between a bipolar plate 5 and a membrane 113. The channels 576 are particularly delimited by walls 575 of the sheet 52. The flow channels 576 form a flow circuit disposed vertically relative to the flow circuit formed by the channels 572. This flow circuit is intended to receive oxidant leaks originating from the flow channels 543. This flow circuit is connected to a pump intended to circulate a fluid, which can be identical to that circulating in the flow channels 572. Such a configuration can prove to be advantageous, for example, when the oxidant is pure dioxygen. This configuration allows independent recovery of oxidant leaks and of leaks of other fluids that can originate from the reactive zone 54.

Figure 13:
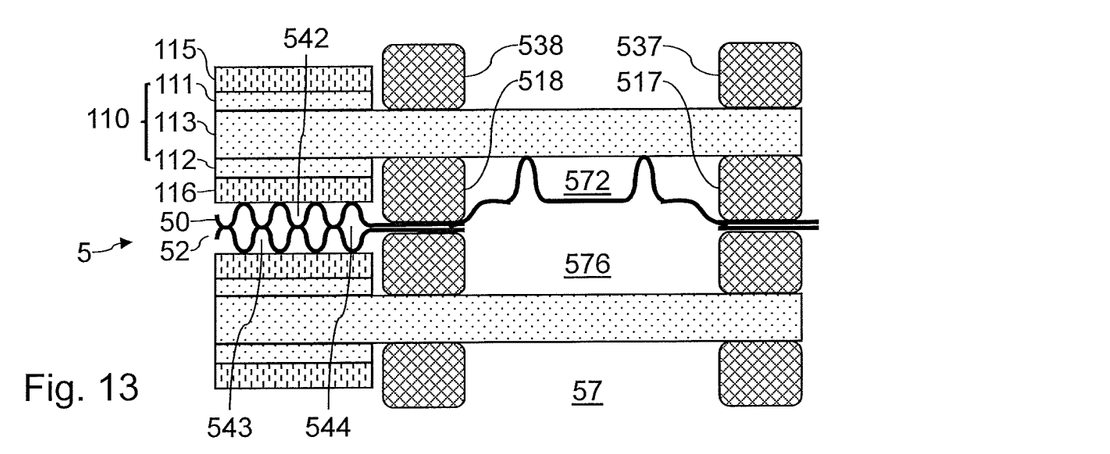

FIG. 13 is a variation of the configuration of FIG. 12. In this variation, the flow channels 576 are deeper than the flow channels 572. Furthermore, the sheet 52 is interrupted at the seals 518 and 538. This configuration allows recovery both of leaks originating from oxidant flow channels 543 and leaks originating from coolant flow channels 544. This configuration allows independent recovery of oxidant leaks and of leaks of other fluids that can originate from the reactive zone 54.

Figure 14:
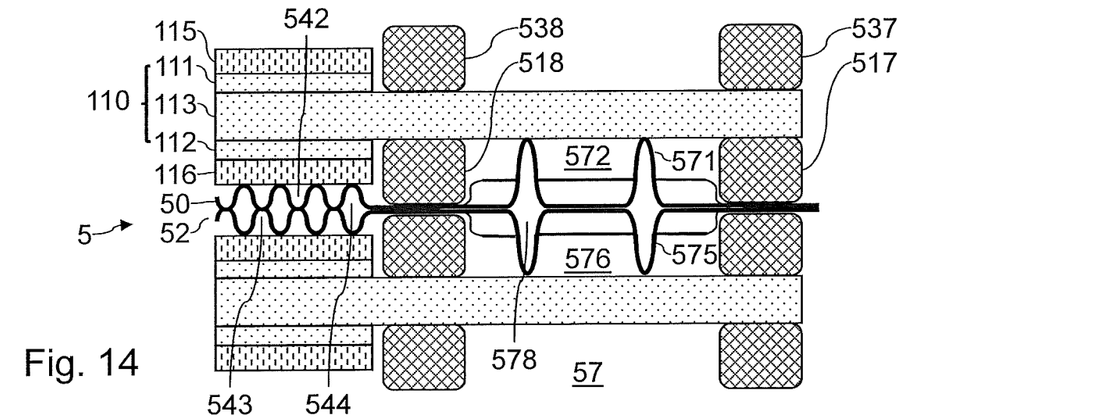

FIG. 14 is a variation of the configuration of FIG. 12. In this variation, flow channels 578 are provided in the intermediate zone 57 between the sheets 51 and 52 in order to recover any coolant leaks originating from the flow channels 544. In this configuration, the leaks of the various fluids flowing into the reactive zone 54 can be recovered independently.

In the configurations shown in FIGS. 5 and 6, it is possible to contemplate that the flow circuit in the intermediate zone 57 recovers air at the output of the reactive zone 54. In such a case, this air will be charged with liquid and/or gaseous water. Using the example of one of the configurations of FIGS. 12 to 14, provision can be made for the membrane to be water permeable in the intermediate zone 57 in order to separate:
 the flow in the flow channels 576 of oxidant intended to be introduced into the manifold 592 intended for the reactive zone 54; and
 the flow in the flow channels 572 of combustion residues originating from the reactive zone 54 through the manifold 595.

The air charged with water at the output of the reactive zone 54 thus can be used to humidify the oxidant air intended to enter the reactive zone 54 without requiring the addition of additional equipment outside the cell.

Figure 15:
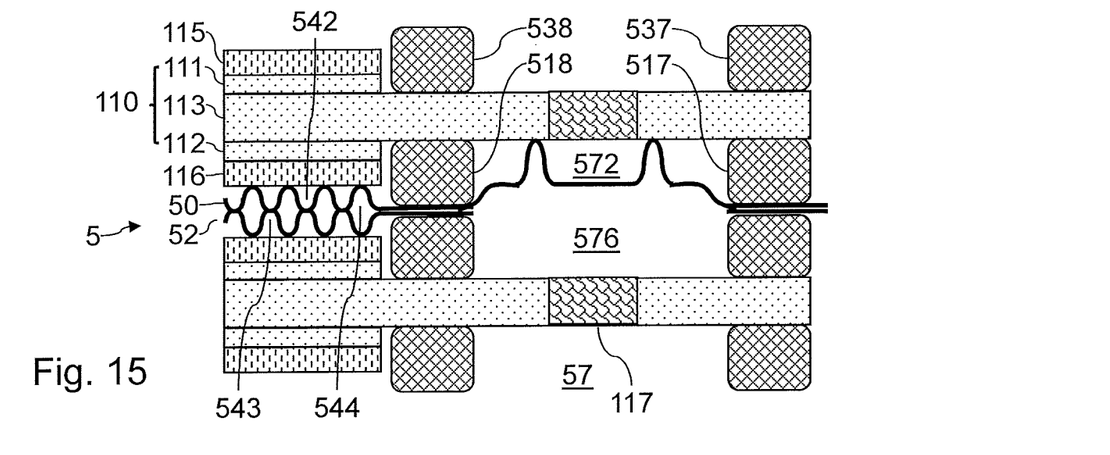

FIG. 15 shows an embodiment of a permeable element or membrane 117, positioned in the membrane 113 in the vicinity of the intermediate zone 57. Other flow configurations also can be contemplated such as, for example, the flow of the oxidant entering the flow channels 572 and the flow of the combustion residues in the flow channels 576. The fluids flowing in the flow channels 572 and 576 thus can be different, using separate manifolds, for example.

The invention also can be applied to a peripheral fluid flow circuit provided inside the bipolar plate 5 in order to recover and to circulate coolant originating from a leak from the reactive zone. The peripheral fluid flow circuit is then provided between two sheets of the bipolar plate 5.

The invention also can be applied to a peripheral fluid flow circuit provided on another outer face of the bipolar plate 5 in order to recover and to circulate oxidant originating from a leak from the reactive zone. The peripheral fluid flow circuit is then provided between this other outer face of the bipolar plate 5 and another membrane electrode assembly.

The invention has been previously described for a fuel cell supplied with dihydrogen fuel. Of course, the invention is also applicable to fuel cells using other types of fuel, for example, methanol.

The various previously described seals can be of any appropriate type, for example, flat seals, O-rings, screen printed seals or seals positioned on the bipolar plates 5 before assembling the fuel cell 4.

In the preceding examples, the flow of fluid in the intermediate zone is generated by means of a pump 6. However, it is also possible to contemplate obtaining such a flow by maintaining a fluid pressure at the inlet of the intermediate zone that is greater than the fluid pressure at the outlet of this intermediate zone.

The invention claimed is:

1. A fuel cell, comprising:
   a flow guide including a bipolar plate formed by two sheets directly connected to one another;
   a first component opposite from a first face of the flow guide, configured to allow a first fluid to flow from a first manifold to a second manifold and through a first reactive zone disposed between the first face of the flow guide and said first component;
   a first peripheral seal disposed between the first face of the flow guide and the first component;
   a first intermediate seal disposed between the first face of the flow guide and the first component, the first intermediate seal being encircled by the first peripheral seal and encircling the first reactive zone;
   a second component opposite from a second face of the flow guide and configured to allow a second fluid to flow from a third manifold to a fourth manifold and through a second reactive zone between the second face of the flow guide and said second component; and
   a first fluid flow circuit provided between the first intermediate seal and the first peripheral seal between fifth and sixth manifolds, the fifth or the sixth manifold being separated from the first to fourth manifolds by said first intermediate seal,
   wherein the first, second, third and fourth manifolds are encircled by the first intermediate seal,
   wherein the fuel cell is configured to convey a fluid, along the first face of the flow guide and entirely outside of a periphery of the first intermediate seal, between said fifth and sixth manifolds in said first fluid flow circuit, and
   wherein the bipolar plate extends continuously in a width direction from the first peripheral seal to the first intermediate seal, and
   wherein a first sheet of the two sheets of the bipolar plate extends upward in a height direction to form at least one wall between the first peripheral seal and the first intermediate seal, a top of the at least one wall being positioned higher than a height of the first sheet at the first peripheral seal and at the first intermediate seal.

2. The fuel cell according to claim 1, wherein said first component is a membrane electrode assembly or another flow guide.

3. The fuel cell according to claim 1, wherein said first component is a membrane electrode assembly including a proton-exchange membrane, the fuel cell further comprising a membrane traversing said proton-exchange membrane and positioned between the first intermediate seal and the first peripheral seal.

4. The fuel cell according to claim 1, further comprising:
   a second peripheral seal disposed vertically relative to the first peripheral seal and disposed between the flow guide and the second component;
   a second intermediate seal disposed vertically relative to the first intermediate seal and disposed between the flow guide and the second component, the second intermediate seal being encircled by the second peripheral seal and encircling the first reactive zone; and
   a second fluid flow circuit being provided between the second intermediate seal and the second peripheral seal between seventh and eighth manifolds,
   wherein the cell is configured to convey a fluid between said seventh and eighth manifolds in said second fluid flow circuit.

5. The fuel cell according to claim 4, wherein the cell is configured to convey different fluids in said first fluid flow circuit and in said second fluid flow circuit.

6. The fuel cell according to claim 1, wherein said first fluid flow circuit extends on at least 80% of the length of the first intermediate seal.

7. The fuel cell according to claim 1, wherein said first fluid flow circuit is filled with oxygen depleted air.

8. The fuel cell according to claim 1, wherein said first fluid flow circuit is filled with air and water.

9. The fuel cell according to claim 1, wherein said first fluid flow circuit is connected to a third fluid flow circuit traversing the first reactive zone.

10. The fuel cell according to claim 1, wherein said first fluid flow circuit comprises two separate flow zones connecting distinct manifolds.

11. The fuel cell according to claim 1, further comprising a pump configured to convey a fluid between said fifth and sixth manifolds in said first fluid flow circuit.

12. The fuel cell according to claim 1, wherein said bipolar plate formed by two sheets connected together and the first face is an outer face of one of the two sheets.

13. The fuel cell according to claim 1, wherein said first fluid flow circuit includes first flow channels delimited by first walls extending in a lengthwise direction of the flow guide.

14. The fuel cell according to claim 13, wherein said first reactive zone includes second flow channels delimited by second walls configured to allow the first fluid to flow from the first manifold to the second manifold, and the first walls are parallel to the second walls.

15. The fuel cell according to claim 1, wherein a second sheet of the two sheets of the bipolar plate extends downward in the height direction to form at least one wall on the second face of the flow guide, the at least one wall formed by the second sheet being located at a same position in the width direction as the at least one wall formed by the first sheet.

16. The fuel cell according to claim 1, wherein a height of the at least one wall formed by the first sheet of the bipolar plate is equal to a height of at least one of the peripheral seal and the first intermediate seal.

17. The fuel cell according to claim 1, wherein a height of the at least one wall formed by the first sheet of the bipolar plate is equal to a height of the peripheral seal and a height of the first intermediate seal.

18. The fuel cell according to claim 1, wherein the first sheet extends continuously in the width direction from the first peripheral seal to the first intermediate seal and a second sheet of the two sheets of the bipolar plate is interrupted from the first peripheral seal to the first intermediate seal.

* * * * *